(12) United States Patent
Lee (10) Patent No.: US 11,588,389 B2
(45) Date of Patent: Feb. 21, 2023

(54) METHOD OF REDUCING LINE LOSS OF POWER SUPPLY SYSTEM AND POWER SUPPLY SYSTEM WITH LINE LOSS REDUCTION

(71) Applicant: DELTA ELECTRONICS, INC., Taoyuan (TW)

(72) Inventor: Wen-Chang Lee, Taoyuan (TW)

(73) Assignee: DELTA ELECTRONICS, INC., Taoyuan (TW)

( * ) Notice: Subject to any disclaimer, the term of this patent is extended or adjusted under 35 U.S.C. 154(b) by 0 days.

(21) Appl. No.: 17/370,555

(22) Filed: Jul. 8, 2021

(65) Prior Publication Data

US 2022/0029521 A1    Jan. 27, 2022

(30) Foreign Application Priority Data

Jul. 24, 2020 (CN) .......................... 202010723510.7

(51) Int. Cl.
*H02M 7/04* (2006.01)
*H02M 1/00* (2006.01)

(52) U.S. Cl.
CPC .......... *H02M 1/0048* (2021.05); *H02M 7/04* (2013.01)

(58) Field of Classification Search
None
See application file for complete search history.

(56) References Cited

U.S. PATENT DOCUMENTS

| 8,004,260 B2 * | 8/2011 | Irving | H02M 1/4225 |
| | | | 323/285 |
| 11,095,212 B2 * | 8/2021 | Smith | H02M 3/3376 |
| 2021/0400601 A1 * | 12/2021 | Lee | H02M 1/10 |

FOREIGN PATENT DOCUMENTS

CN           208316578 U       1/2019

OTHER PUBLICATIONS

Office action issued in correspondingTaiwan patent application No. 109125101 dated Apr. 9, 2021 (5 pages).

* cited by examiner

*Primary Examiner* — Jeffery S Zweizig
(74) *Attorney, Agent, or Firm* — Muncy, Geissler, Olds & Lowe, P.C.

(57) ABSTRACT

A power supply system with line loss reduction supplies power to a load through a power line. The power supply system includes a step-up converter, a detection circuit, and a control unit. The control unit sets a terminal voltage required by the load, controls an output voltage of the step-up converter to be terminal voltage, and acquires an output current corresponding to the terminal voltage to be a present current by the detection circuit. The control unit controls the output voltage to be a modulated voltage, and acquires an output current corresponding to the modulated voltage to be a modulated current by the detection circuit. The control unit adjusts the output voltage to be a first predetermined voltage according to the terminal voltage, the present current, the modulated voltage, and the modulated current.

24 Claims, 4 Drawing Sheets

METHOD OF REDUCING LINE LOSS OF POWER SUPPLY SYSTEM AND POWER SUPPLY SYSTEM WITH LINE LOSS REDUCTION

BACKGROUND

Technical Field

The present disclosure relates to a method of reducing line loss of a power supply system and a power supply system with line loss reduction, and more particularly to a method of reducing line loss of power supply system and a power supply system with line loss reduction without measuring impedance of a power line.

Description of Related Art

The statements in this section merely provide background information related to the present disclosure and do not necessarily constitute prior art.

The base station usually includes a baseband unit (BBU), a remote radio unit (RRU), and one or more antenna units. In 5G (5th generation) applications, the RRU and the antenna unit(s) may also be integrated into an active antenna unit (AAU). Regardless of whether it is RRU or AAU, it usually needs to be set up in a higher or farther place to facilitate the transmission and reception of signals. Therefore, communication equipment such as RRU/AAU is usually constructed on the highest point of an electric tower. At present, there is a certain distance between a power supply system and the load on the electric tower, and the distance will bring a certain degree of power loss and voltage drop in power line transmission. Especially in 5G system, since the equipment power on the electric tower will increase, the power loss and voltage drop during transmission cannot be ignored. It is necessary to think about how to reduce the power transmission loss.

In general, since the higher output voltage can reduce transmission current and reduce line loss under the condition of without affecting the voltage of the base station equipment under the electric tower, a step-up apparatus is added. However, it must be ensured that the voltage at the load terminal cannot exceed the maximum allowable voltage of the equipment. One manner of the existing practice is to use a detector, which is installed on the electric tower, to detect the voltage at the load terminal, and a communication device is provided to communicate with a power system of the base station. When the load current is larger, the output voltage of the power system is increased to maintain the voltage at the load terminal. However, this manner increases the difficulty and cost of construction, and the communication failure is possible. Another manner of the existing practice is to use a step-down device for converting the voltage transmitted to the electric tower to supply the equipment on the electric tower. However, additional losses are generated from the step-down device, and it is difficult in maintenance since the step-down device is installed on the electric tower. Further another manner of the existing practice is to estimate the impedance of the power line by the length, thickness and other information of the power line known in advance so as to compensate the voltage according to the output current. However, the problem of this manner is that the impedance of the power line will change due to aging, or no updated information in real time, which may easily cause voltage compensation errors and damage the equipment.

Accordingly, how to design a method of reducing line loss of power supply system and a power supply system with line loss reduction to accurately and quickly calculate the voltage level of power supply equipment that needs to be adjusted to meet the needs of communication equipment by using special voltage compensation calculation is a major issue that the inventors of the present disclosure want to overcome and solve.

SUMMARY

In order to solve the problems above, a method of reducing line loss of a power supply system is provided. The method of reducing line loss of the power supply system includes steps of: setting a terminal voltage required by the load, and controlling an output voltage of the step-up converter to be the terminal voltage, detecting an output current corresponding to the terminal voltage to be a present current, controlling the output voltage to be a modulated voltage, and detecting the output current corresponding to the modulated voltage to be a modulated current, and adjusting the output voltage to be a first predetermined voltage according to the terminal voltage, the present current, the modulated voltage, and the modulated current. The load voltage acquired by subtracting a power line voltage drop of the power line from the first predetermined voltage equals the terminal voltage.

In order to solve the problems above, a power supply system with line loss reduction is provided. The power supply system includes a step-up converter, a detection circuit, and a control unit. The step-up converter has an input end and an output end, the input end receives an input voltage, and the output end provides an output voltage to supply power to the load. The detection circuit is coupled to the output end. The control unit is coupled to the step-up converter and the detection circuit, and controls the step-up converter to convert the input voltage into the output voltage. The control unit sets a terminal voltage required by the load, and controls the output voltage to be the terminal voltage; the control unit acquires an output current corresponding to the terminal voltage to be a present current by detecting the output end by the detection circuit; the control unit controls the output voltage to be a modulated voltage, and acquires an output current corresponding to the modulated voltage to be a modulated current by detecting the output end by the detection circuit; the control unit adjusts the output voltage to be a first predetermined voltage according to the terminal voltage, the present current, the modulated voltage, and the modulated current so that the load voltage acquired by subtracting a power line voltage drop of the power line from the first predetermined voltage equals the terminal voltage.

The main purpose and effect of the present disclosure are to acquire the voltage drop of the power line without adding conversion equipment, impedance measurement equipment, or additional communication device, and to accurately and quickly calculate the voltage to be adjusted so as to reduce the transmission loss of the power line due to the increase of the voltage at the input end of the load and ensure the voltage at the input end of the load does not exceed the maximum allowable voltage under different load conditions.

It is to be understood that both the foregoing general description and the following detailed description are exemplary, and are intended to provide further explanation of the present disclosure as claimed. Other advantages and features of the present disclosure will be apparent from the following description, drawings and claims.

BRIEF DESCRIPTION OF DRAWINGS

The present disclosure can be more fully understood by reading the following detailed description of the embodiment, with reference made to the accompanying drawing as follows.

DETAILED DESCRIPTION

Reference will now be made to the drawing figures to describe the present disclosure in detail. It will be understood that the drawing figures and exemplified embodiments of present disclosure are not limited to the details thereof.

Figure 1:
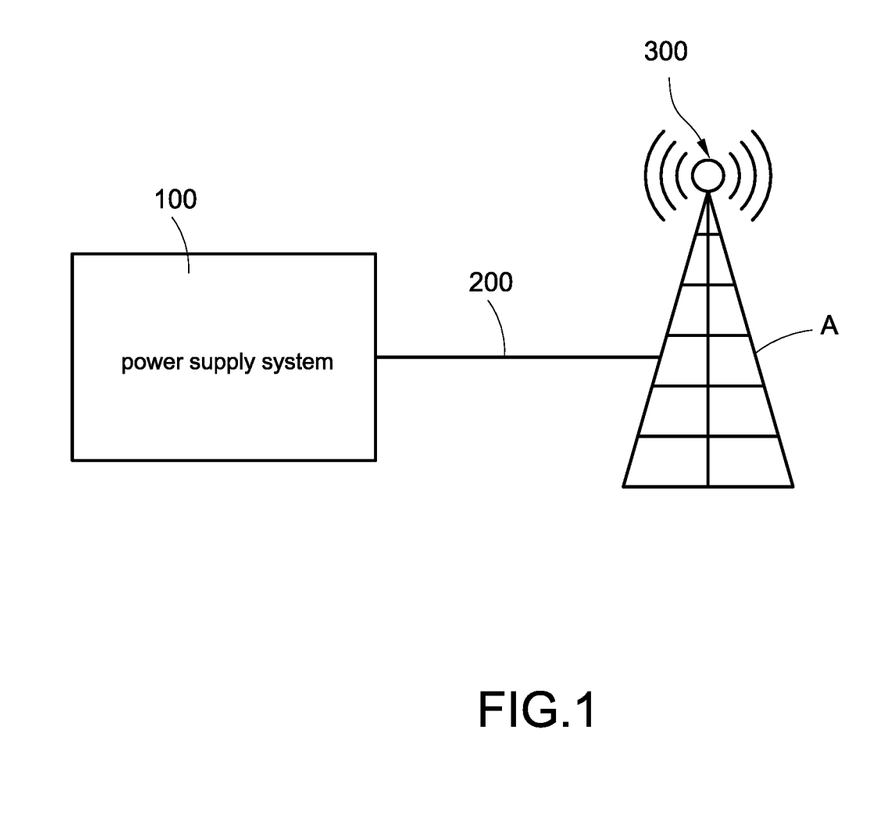
FIG. 1 is a system structure diagram of a power supply system with line loss reduction according to the present disclosure.

Please refer to FIG. 1, which shows a system structure diagram of a power supply system with line loss reduction according to the present disclosure. The power supply system 100 is coupled to a load 300 through a power line 200, and the power supply system 100 and the load 300 are far apart. Take an electric tower A shown in FIG. 1 as an example, the power supply system 100 is installed under the electric tower A, and the load 300 is installed on the electric tower A. In one embodiment, the load 300 may be a device with a larger power consumption, such as but not limited to a 5G communication device. Since the length of the power line 200 is almost equal to the height of the electric tower A, the line loss of the power line 200 is considerable, and a voltage difference between an output voltage of the power supply system 100 and a voltage received by the load 300 is significant. If the current drawn by the load 300 is larger, the voltage difference can even exceed 10 volts. Also, the greater the current flowing through the power line 200, the greater the line loss. Therefore, in the case where the load 300 is a device with a large power consumption, it is very important to reduce the line loss of the power line 200.

Figure 2:
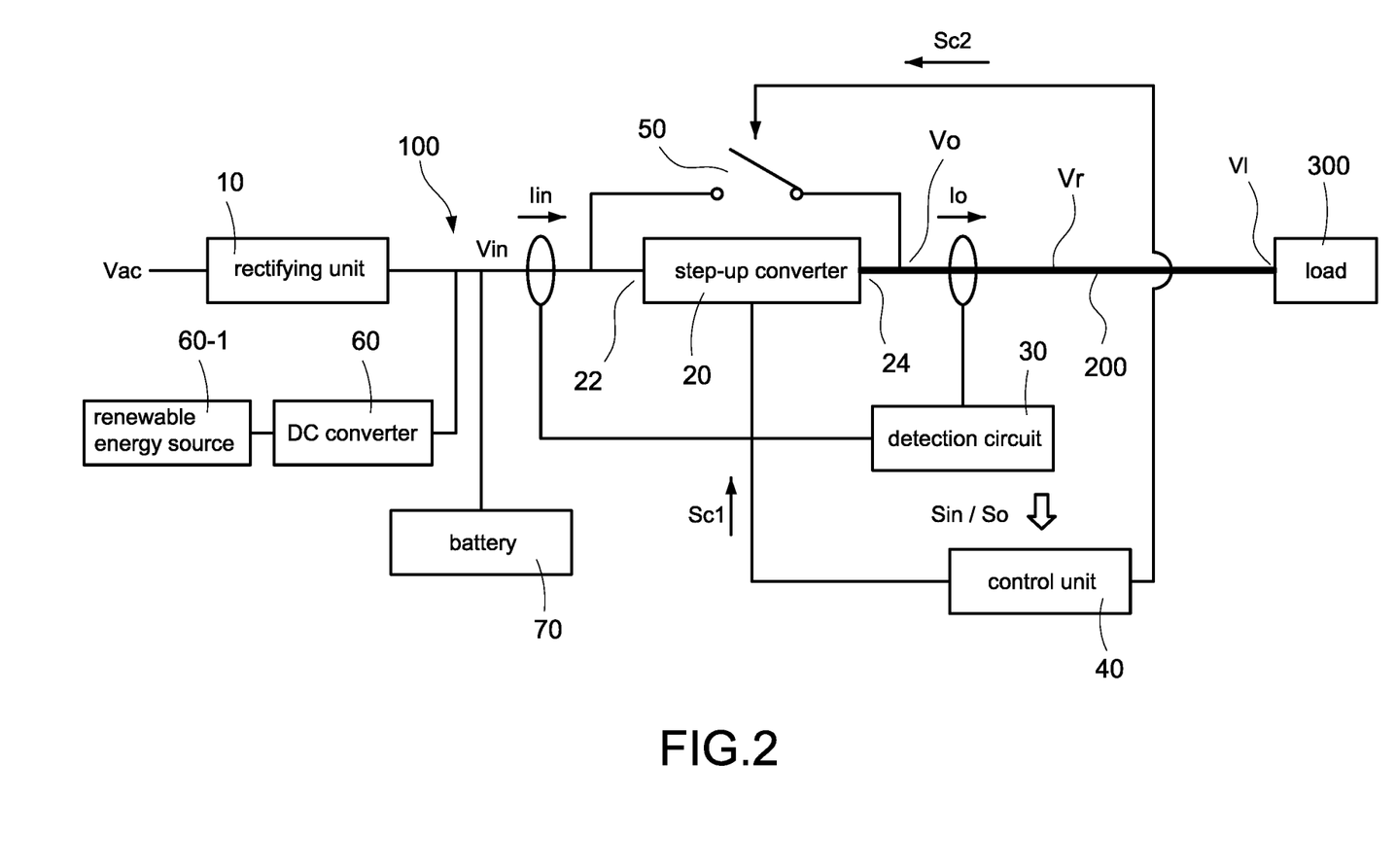
FIG. 2 is a block circuit diagram of the power supply system with line loss reduction according to the present disclosure.

Please refer to FIG. 2, which shows a block circuit diagram of the power supply system with line loss reduction according to the present disclosure, and also refer to FIG. 1. The power supply system 100 under the electric tower A supplies power to the load 300 on the electric tower A. The power supply system 100 includes a rectifying unit 10, a step-up converter 20, a detection circuit 30, and a control unit 40. An input end 22 of the step-up converter 20 is coupled to the rectifying unit 10, and an output end 24 of the step-up converter 20 is coupled to the load 300 through the power line 200. The rectifying unit 10 receives an AC voltage Vac and rectifies the AC voltage Vac into an input voltage Vin. The step-up converter 20, which is controlled by the control unit 40, receives the input voltage Vin and converts the input voltage Vin into an output voltage Vo. The power line 200 receives the output voltage Vo and a power line voltage drop Vr of the power line 200 exists, therefore a terminal end of the power line 200 provides a load voltage Vl to the load 300. Since the power line voltage drop Vr is the decrease of electrical potential along the power line 200, the load voltage Vl is less than the output voltage Vo.

The detection circuit 30 is coupled to the output end 24 of the step-up converter 20, and is used to detect the output voltage Vo at the output end 24 and an output current Io flowing through the output end 24. The detection circuit 30 provides an output signal So to the control unit 40 according to the output voltage Vo and the output current Io so that the control unit 40 receives information about a voltage value of the output voltage Vo and/or a current value of the output current Io. The control unit 40 receives the output signal So and provides a first control signal Sc1 to the step-up converter 20 according to the output signal So so as to regulate and stabilize the voltage value of the output voltage Vo to a predetermined voltage value. In one embodiment, the step-up converter 20, the detection circuit 30, and the control unit 40 may be integrated into a power supply, and the control unit 40 may be a power control processor of the power supply.

The power supply system 100 further includes a bypass switch 50, a DC converter 60, a renewable energy source 60-1, and a battery 70. The bypass switch 50 is connected to the step-up converter 20 in parallel, that is, one end of the bypass switch 50 is coupled to the input end 22 of the step-up converter 20, and the other end of the bypass switch 50 is coupled to the output end 24 of the step-up converter 20. The bypass switch 50 is further coupled to the control unit 40. The bypass switch 50 is controlled by a second control signal Sc2 provided by the control unit 40. When the bypass switch 50 is turned on by the second control signal Sc2, the step-up function of the step-up converter 20 is unavailable. The DC converter 60 may be coupled to a backup power source, for example but not limited to the renewable energy source 60-1 to output a DC voltage. The renewable energy source 60-1 may be a solar energy, a wind energy, or other renewable energy sources. The DC converter 60 can be selectively used according to system requirements, or connected to other backup energy sources in different configurations. The battery 70 is coupled to the input end 22 of the step-up converter 20, and is configured to provide input voltage Vin to supply power to the step-up converter 20 when the absence of the AC voltage Vac or no power is outputted from the DC converter 60. In particular, the input voltage Vin is mainly used to provide the required voltage for the base station equipment under the electric tower A, including the baseband units or other equipment (not shown).

Figure 3A:
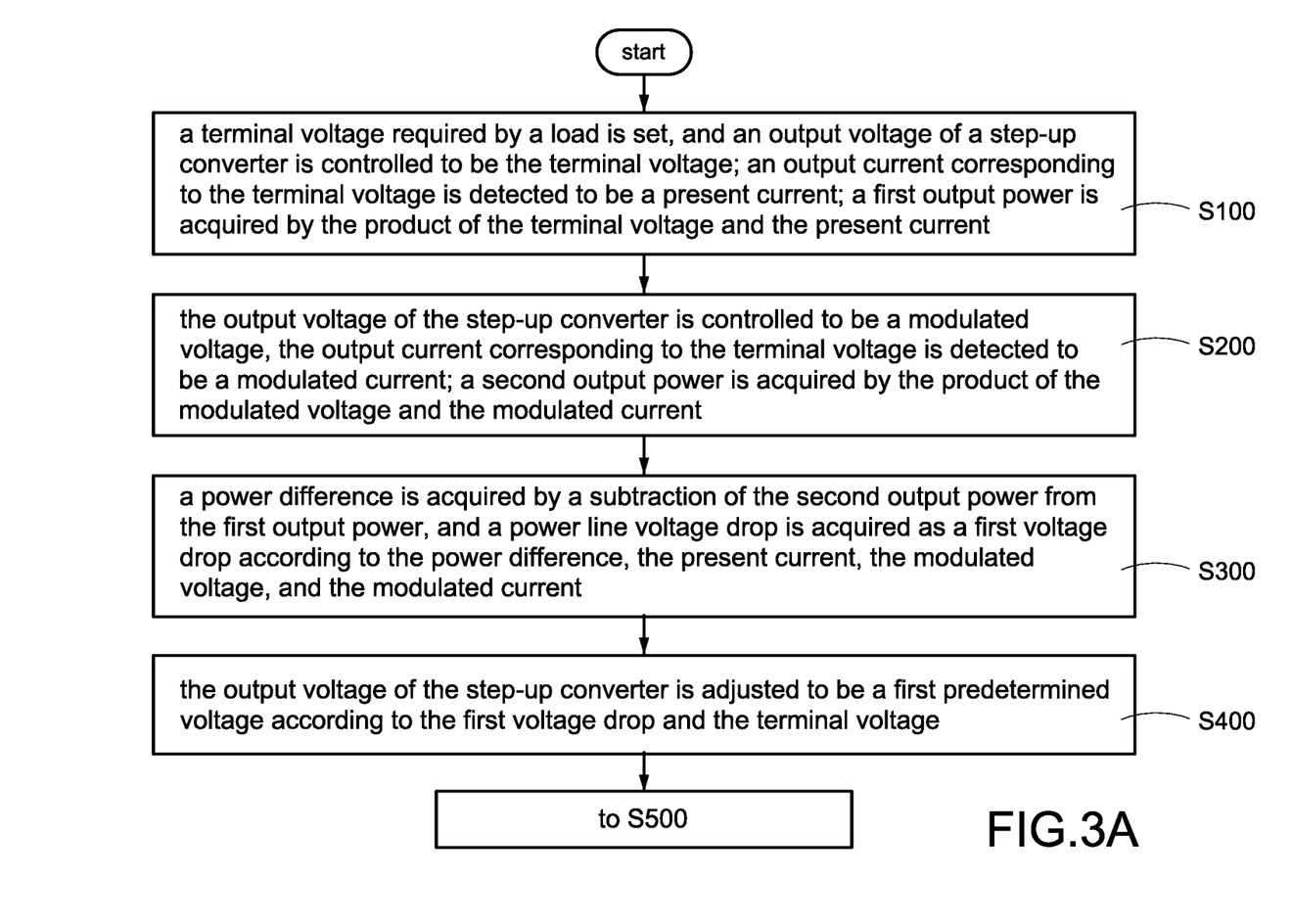
FIG. 3A is a flowchart of a method of reducing line loss of the power supply system according to the present disclosure.

Please refer to FIG. 3A, which shows a flowchart of a method of reducing line loss of the power supply system according to the present disclosure, and also refer to FIG. 1 and FIG. 2. The overall efficiency of the power supply system 100 is not only affected by the line loss but also the efficiency of step-up converter 20 and other added converter (s), such as step-down converter(s) on the electric tower A. Therefore, the improvement of the overall efficiency of the power supply system 100 depends on not only the reduction of the line loss of the power line 200 but also the improvement of the efficiency of the converters. Further, there will be different adjustment mechanisms under different load conditions. Moreover, if the AC voltage Vac is available, the above-mentioned factors affecting the overall efficiency of the power supply system 100 need to be considered for the adjustment of the output voltage Vo. If the AC voltage Vac is unavailable and the battery 70 is used to supply power, both the above-mentioned factors and the battery capacity of the battery 70 affecting the overall efficiency of the power supply system 100 need to be considered for the adjustment of the output voltage Vo. Therefore, there are many consideration factors for the adjustment of the output voltage Vo, which must be determined according to the overall efficiency and requirements of the power supply system 100.

The present disclosure proposes a method of reducing line loss, and the method includes steps as follows. First, a terminal voltage required by the load is set, and an output voltage of the step-up converter is controlled to be the terminal voltage; an output current corresponding to the terminal voltage is detected to be a present current; a first output power is acquired by the product of the terminal voltage and the present current (S100). The detection circuit 30 detects the output end 24 of the step-up converter 20 to provide an output signal So to the control unit 40. The control unit 40 can control the output voltage Vo of the step-up converter 20 to be the terminal voltage through the output signal So according to general feedback control principles, and can detect the output current corresponding to the terminal voltage to be the present current. Afterward, the control unit 40 acquires the first output power provided by the step-up converter 20 by the product of the terminal voltage and the present current. Since the first output power provided by the step-up converter 20 is equal to the power consumed by the power line 200 plus the power consumed by the load 300, $Vo1 \times Io1 = Vr1 \times Io1 + Vl1 \times Io1$. In which, Vo1 represents the output voltage of the step-up converter at this time and the output voltage is the terminal voltage set by the control unit 40, Io1 represents the present current, Vr1 represents the current power line voltage drop, i.e., the first voltage drop, and Vl1 represents the current load voltage.

Afterward, the output voltage of the step-up converter is controlled to be a modulated voltage, the output current corresponding to the terminal voltage is detected to be a modulated current; a second output power is acquired by the product of the modulated voltage and the modulated current (S200). The control unit 40 modulates the output voltage Vo by controlling the step-up converter 20 so as to modulate the output voltage Vo to the modulated voltage, that is, the voltage value of the output voltage Vo is changed. The control unit 40 can control the output voltage Vo of the step-up converter 20 to be the modulated voltage through the output signal So, and detect the output current corresponding to the modulated voltage to be the modulated current. Afterward, the control unit 40 calculates the second output power provided by the step-up converter 20 by the product of the modulated voltage and the modulated current. Since the second output power provided by the step-up converter 20 is equal to the power consumed by the power line 200 plus the power consumed by the load 300, $Vo2 \times Io2 = Vr2 \times Io2 + Vl2 \times Io2$. In which, Vo2 represents the modulated voltage, Io2 represents the modulated current, Vr2 represents the power line voltage drop after modulation, and Vl2 represents the load voltage at this time.

Afterward, a power difference is acquired by a subtraction of the second output power from the first output power, and the power line voltage drop is acquired as a first voltage drop according to the power difference, the present current, the modulated voltage, and the modulated current (S300). Theoretically, the power of the load 300 before modulation will be equal to the power of the load 300 after modulation under the condition that the power of the load remains unchanged, that is, $Vl1 \times Io1 = Vl2 \times Io2$. Therefore, the current power line voltage drop Vr1 can be acquired: $Vr1 = \Delta P \times Io1/(Io1^2 - Io2^2)$. In which, $\Delta P$ represents the power difference between the first output power and the second output power. The power difference can be acquired by a subtraction of the second output power from the first output power. Therefore, under the known power difference, present current, modulated voltage and modulated current, the current power line voltage drop, i.e., the first voltage drop can be acquired. Through the above-mentioned steps and processes, the voltage drop of the power line 200, i.e., the power line voltage drop can be acquired without measuring the impedance of the power line 200. In order to avoid that the power of the load 300 before modulation is not equal to the power of the load 300 after modulation, that is, the calculated value of the first voltage drop is not correct due to the change of the load 300 during the modulation of the output voltage Vo, the control unit 40 can set a confirmation mechanism to avoid occurring the above-mentioned situation. Specifically, after the output voltage Vo of the step-up converter 20 is modulated from the terminal voltage to the modulated voltage, the control unit 40 adjusts the output voltage Vo back to the terminal voltage, and acquires the output power at this time by the product of the terminal voltage and the output current Io at this time, thereby confirming whether the output power at this time is within an error range of the first output power. Alternatively, the control unit 40 detects the output current Io at this time to be a confirmation current, and determines whether the confirmation current is within an error range of the present current Io1 which is previously detected. The error range can be selected according to design requirements, such as but not limited to 3%. When the output power at this time or the output current Io at this time is within the error range, it means that the power of the load 300 is approximately equal to the original value, and the calculated value of the first voltage drop is correct. On the contrary, it means that the power of the load 300 has changed, and the calculated value of the first voltage drop is not correct.

Finally, the output voltage of the step-up converter is adjusted to be a first predetermined voltage according to the first voltage drop and the terminal voltage (S400). In the step (S300), the power line voltage drop, i.e., the first voltage drop is acquired. Since the load power is roughly the same, it can be acquired under this condition, how much the voltage value of the output voltage Vo needs to be adjusted so that the load voltage (at the input end) of the load 300 will be exactly equal to the terminal voltage. Since the output current Io corresponding to the output voltage Vo and the voltage drop of the power line 200 will change once the output voltage Vo of the step-up converter 20 is adjusted, it is not just to directly add the first voltage drop Vr1 and the terminal voltage Vo1. Actually, the first predetermined voltage Vo(set), i.e., the output voltage after adjustment can be acquired by adding the terminal voltage Vo1 and a compensation voltage of the power line voltage drop Vr1 in response to current changes, that is, $Vo(set) = Vo1 + Vr1 \times (Vo1 - Vr1)/Vo1$, in which, Vo(set) represents the first predetermined voltage. After the control unit 40 acquires the first predetermined voltage according to the above steps, the control unit 40 adjusts the output voltage Vo of the step-up converter 20 to the first predetermined voltage according to the first control signal Sc1 so that the voltage at the input end of the load 300 is exactly equal to the terminal voltage Vo1 predetermined by the control unit 40. Therefore, the main purpose of the present disclosure is to acquire the voltage drop of the power line 200 according to the output voltage and output current of the step-up converter 20 measured/detected by the detection circuit 30 without adding communication equipment or impedance measurement equipment. Since the impedance of the power line 200 and the voltage at the input end of the load 300 are not acquired and confirmed, the voltage to be adjusted can be accurately and quickly calculated without using additional circuits.

In short, since the voltage drop on the power line 200 exists, the higher output voltage can reduce transmission current, thereby reducing line loss, but it cannot exceed the maximum allowable voltage of the equipment on the electric tower. Therefore, the control unit 40 predetermines the terminal voltage required by the load 300, controls the output voltage Vo of the step-up converter 20 to be the terminal voltage and the modulated voltage, and detects the currents corresponding to the terminal voltage and the modulated voltage so as to acquire the power line voltage drop, i.e., the first voltage drop when the output voltage Vo is equal to the terminal voltage. Accordingly, how to adjust the output voltage Vo of the step-up converter 20 can be quickly implemented, and the voltage at the input end of the load 300 can be accurately maintained at the terminal voltage.

Figure 3B:
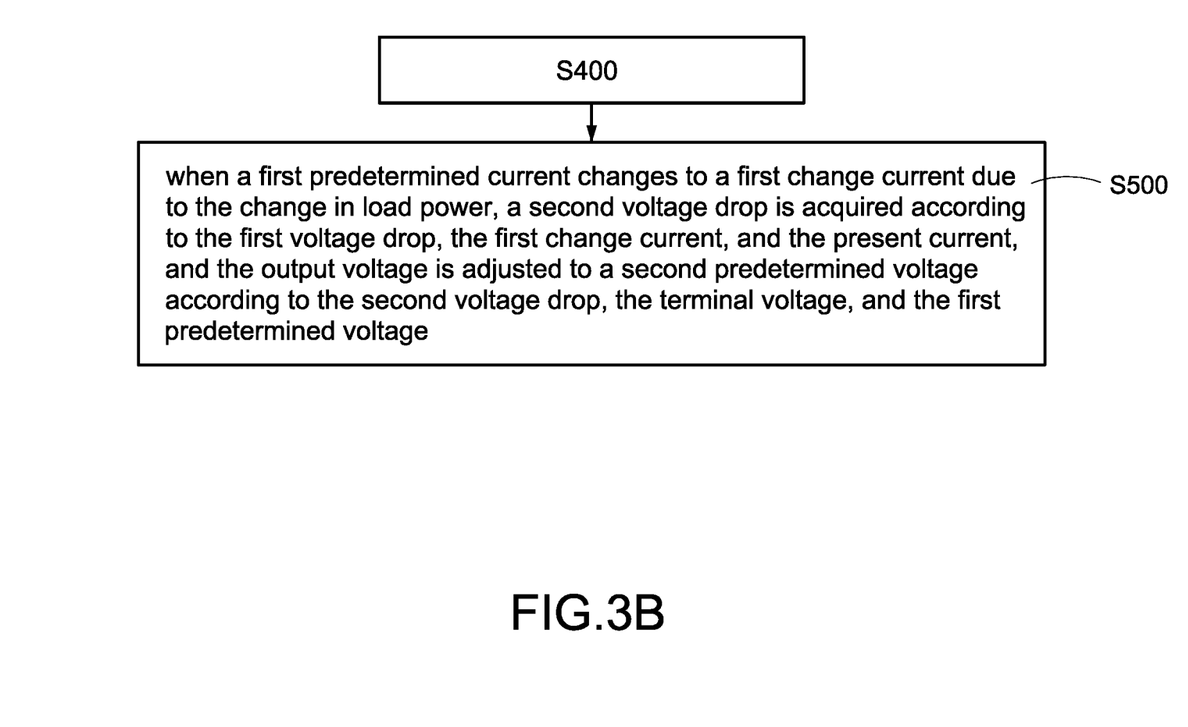
FIG. 3B is a flowchart continued after FIG. 3A.

Please refer to FIG. 3B, which shows a flowchart continued after FIG. 3A, and also refer to FIG. 1 to FIG. 3A. After the control unit 40 adjusts the output voltage Vo of the step-up converter 20 to the first predetermined voltage, the output current Io at this time is the first predetermined current. When the load power of the load 300 changes, the voltage value of the load voltage Vl will also change accordingly and no longer equal to the terminal voltage due to the influence of the power line voltage drop Vr of the power line 200. Therefore, when the load power of the load 300 changes, the control unit 40 must adjust the voltage value of the output voltage Vo to response to the change in the load power. The final adjusted value of the output voltage Vo can be acquired through the following steps. When the first predetermined current changes to a first change current Io3 due to the change in the load power, a second voltage drop Vr3 is acquired according to the first voltage drop, the first change current Io3, and the present current Iol, and the output voltage Vo is adjusted to a second predetermined voltage according to the second voltage drop Vr3, the terminal voltage Vo1, and the first predetermined voltage Vo(set) (S500).

Specifically, when the load power changes, the current value of the output current Io will change, that is, the first predetermined current changes to the first change current Io3. Since the change of the output current Io is proportional to the change of the power line voltage drop Vr, the change of the power line voltage drop Vr (i.e., from the first voltage drop Vr1 to the second voltage drop Vr3) can be acquired according to the formula: $Vr3=Vr1 \times Io3/Io1$ when the output current Io is the first change current Io3 detected by the detection circuit 30. In which, Vr3 represents the second voltage drop, Io3 represents the first change current, and Iol represents the present current corresponding to the first voltage drop. Since the output voltage Vo of the step-up converter 20 is the first predetermined voltage Vo(set) and the power line voltage drop Vr becomes the second voltage drop Vr3, a new predetermined value of the output voltage Vo, i.e., a second predetermined voltage Vo(set2) can be determined by replacing the above-mentioned formula (Vo(set)=Vo1+Vr1×(Vo1−Vr1)/Vo1), that is, $Vo(set2)=Vo1+Vr3 \times (Vo(set)-Vr3)/Vo1$. Therefore, the voltage at the input end of the load 300 can be accurately maintained at the terminal voltage Vo1 when the load power changes. Also, when the load power continues to change, the same control method is adopted. For example, if the output current Io continues to change from the first change current Io3 to a second change current Io4, a third voltage drop Vr4 can be acquired: $Vr4=Vr1 \times Io4/Io1$. According to the foregoing principle, the output voltage Vo can be adjusted to a third predetermined voltage Vo(set3):$Vo(set3)=Vo1+Vr4 \times (Vo(set2)-Vr4)/Vo1$ so as to ensure that the voltage at the input end of the load 300 is the terminal voltage Vo1 which is predetermined. The subsequent load changes all use the same replacement iterative principle, and will not be repeated.

Please refer to FIG. 2 again, in some special conditions, the control unit 40 provides the second control signal Sc2 to turn on the bypass switch 50 so as to bypass the step-up converter 20. Specifically, the step-up converter 20 has different conversion efficiencies under different load conditions. Take every 10% of the load as a point, a total of 10 points from 10% to 100% of the load. For example, the load may have the lowest efficiency at 10%, and the efficiency from 10% to 40% upward trends, and the highest efficiency at 50%, and the efficiency from 60% to 100% downward trends. Under the lower load condition, the conversion efficiency of the step-up converter 20 is poor and the larger power loss is caused. Since the line loss is less due to the smaller current under the lower load condition, the bypass switch 50 may be turned on to bypass the step-up converter 20, thereby saving the loss of the step-up converter 20. Therefore, the control unit 40 calculates how much the output voltage Vo needs to be adjusted, how much power loss of the power line 200 can be reduced, and the power consumption of the step-up converter 20. Accordingly, the control unit 40 can determine whether the step-up mode or the bypass mode is performed so as to achieve the highest efficiency of the system.

The highest efficiency of the system can be confirmed by the following methods: confirm the conversion efficiency of the step-up converter 20 to acquire the increase of loss; confirm the line loss of the power line 200 if the step-up converter 20 is bypassed (i.e., the input voltage Vin is directly supplied to the power line 200); confirm the loss of the step-up converter 20 and that of the power line 200 when the step-up converter 20 operates. According to the confirmation of the losses, the control unit 40 can determine whether the step-up mode or the bypass mode is performed so as to achieve the highest efficiency of the system.

The following are examples of feasible solutions for the confirmation of the losses, but not limited to this. The conversion efficiency of the step-up converter 20 can be acquired by the built-in conversion efficiencies of each load which is measured in advance, or the input power and output power of the step-up converter 20 are detected in real time to acquire the loss of the step-up converter 20 under the specific load 300. When the step-up converter 20 is bypassed, since the input voltage Vin, the terminal voltage Vo1, the power line voltage drop, and the first predetermined current are known (i.e., the power consumption of the load 300 is known), the control unit 40 can calculate the line loss of the power line 200. For example, the control unit 40 can use Newton's iterative method to solve the current when the step-up converter 20 is bypassed to acquire the line loss of the power line 200. When the step-up converter 20 operates, the loss of the step-up converter 20 and that of the power line 200 can be easily acquired. Take the first predetermined voltage as an example, the line loss of the power line 200 is equal to the product of the first predetermined current the power line voltage drop $(Vr1 \times (Vo1-Vr1)/Vo1)$ according to the formula: $Vo(set)=Vo1+Vr1 \times (Vo1-Vr1)/Vo1$.

In addition, another embodiment is simpler and can be used: when the voltage at the input end of the load 300 can be maintained at the terminal voltage, it means that the load 300 may be low if the voltage difference between the input voltage Vin and the output voltage Vout of the step-up converter 20 is less than a voltage threshold (i.e., the voltage at the input end of the load 300 can be maintained at the terminal voltage as long as the output voltage Vout is increased slightly). At this condition, the step-up converter 20 can be bypassed to reduce the conversion loss of the step-up converter 20. In which, the voltage threshold can be appropriately selected according to the efficiency curve of the step-up converter 20.

Although the present disclosure has been described with reference to the preferred embodiment thereof, it will be understood that the present disclosure is not limited to the details thereof. Various substitutions and modifications have been suggested in the foregoing description, and others will occur to those of ordinary skill in the art. Therefore, all such substitutions and modifications are intended to be embraced within the scope of the present disclosure as defined in the appended claims.

What is claimed is:

1. A method of reducing line loss of a power supply system, the power supply system comprising a step-up converter, and the step-up converter providing a load voltage to a load through a power line, the method comprising steps of:
    setting a terminal voltage required by the load, and controlling an output voltage of the step-up converter to be the terminal voltage,
    detecting an output current corresponding to the terminal voltage to be a present current,
    controlling the output voltage to be a modulated voltage, and detecting the output current corresponding to the modulated voltage to be a modulated current, and
    adjusting the output voltage to be a first predetermined voltage according to the terminal voltage, the present current, the modulated voltage, and the modulated current,
    wherein the load voltage acquired by subtracting a power line voltage drop of the power line from the first predetermined voltage equals the terminal voltage, and
    wherein under a condition that the output voltage is adjusted to the first predetermined voltage to satisfy that the load voltage is the terminal voltage which is predetermined, when the output voltage is equal to the first predetermined voltage, the sum of a loss of the step-up converter and a loss of the power line is calculated as a first loss, when the step-up converter is bypassed, the loss of the power line is calculated as a second loss; when the first loss is greater than or equal to the second loss, the step-up converter is bypassed.

2. The method of reducing line loss of the power supply system in claim 1, further comprising steps of:
    acquiring a first output power by the product of the terminal voltage and the present current,
    acquiring a second output power by the product of the modulated voltage and the modulated current,
    acquiring a power difference by subtracting the second output power from the first output power, and
    adjusting the output voltage to the first predetermined voltage according to the power difference, the terminal voltage, the present current, the modulated voltage, and the modulated current.

3. The method of reducing line loss of the power supply system in claim 2, further comprising steps of:
    acquiring the power line voltage drop as a first voltage drop according to the power difference, the present current, the modulated voltage, and the modulated current, and
    adjusting the output voltage to the first predetermined voltage through the first voltage drop and the terminal voltage.

4. The method of reducing line loss of the power supply system in claim 2, wherein after the output voltage is adjusted from the terminal voltage to the modulated voltage, the output voltage is adjusted back to the terminal voltage to confirm whether the product of the terminal voltage and the output current corresponding to the terminal voltage is within an error range of the first output power.

5. The method of reducing line loss of the power supply system in claim 3, wherein the first predetermined voltage satisfies:

$$Vo(set)=Vo1+Vr1\times(Vo1-Vr1)/Vo1,$$

in which, Vo(set) represents the first predetermined voltage, Vo1 represents the terminal voltage, and Vr1 represents the first voltage drop.

6. The method of reducing line loss of the power supply system in claim 3, wherein when the output voltage is adjusted to the first predetermined voltage, the output current is a first predetermined current; when a load power of the load changes so that the first predetermined current changes to a first change current, a second voltage drop is acquired according to the first voltage drop, the first change current, and the present current, and the output voltage is adjusted to a second predetermined voltage according to the terminal voltage the first predetermined voltage, and the second voltage drop.

7. The method of reducing line loss of the power supply system in claim 6, wherein the second voltage drop satisfies:

$$Vr3=Vr1\times Io3/Io1,$$

in which, Vr3 represents the second voltage drop, Vr1 represents the first voltage drop, Io3 represent the first change current, and Io1 represents the present current.

8. The method of reducing line loss of the power supply system in claim 1, wherein under a condition that the output voltage is adjusted to the first predetermined voltage to satisfy that the load voltage is the terminal voltage, the step-up converter is bypassed when a voltage difference between an input voltage and an output voltage of the step-up converter is less than a voltage threshold.

9. A power supply system with line loss reduction configured to provide a load voltage to a load through a power line, the power supply system comprising:
    a step-up converter having an input end and an output end, the input end configured to receive an input voltage, and the output end configured to provide an output voltage to supply power to the load,
    a detection circuit coupled to the output end,
    a control unit coupled to the step-up converter and the detection circuit, and configured to control the step-up converter to convert the input voltage into the output voltage, and
    a bypass switch coupled to the step-up converter in parallel and coupled to the control unit,
    wherein the control unit sets a terminal voltage required by the load, and controls the output voltage to be the terminal voltage; the control unit acquires an output current corresponding to the terminal voltage to be a present current by detecting the output end by the detection circuit; the control unit controls the output voltage to be a modulated voltage, and acquires an output current corresponding to the modulated voltage to be a modulated current by detecting the output end by the detection circuit; the control unit adjusts the output voltage to be a first predetermined voltage according to the terminal voltage, the present current, the modulated voltage, and the modulated current so that the load voltage acquired by subtracting a power line voltage drop of the power line from the first predetermined voltage equals the terminal voltage, and wherein when the control unit calculates the sum of a loss of the step-up converter and a loss of the power line as a first loss when the output voltage is equal to the first predetermined voltage, and calculates the loss of the power line as a second loss when the step-up converter is bypassed; when the control unit determines that the first loss is greater than or equal to the second loss, the control unit turns on the bypass switch to bypass the step-up converter.

10. The power supply system with line loss reduction in claim 9, wherein after the output voltage is adjusted from the terminal voltage to the modulated voltage, the control unit adjusts the output voltage back to the terminal voltage, and detects that the output current to be a confirmation current through the detection circuit; the control unit determines whether the confirmation current is within an error range of the present current.

11. The power supply system with line loss reduction in claim 9, wherein when the output voltage is adjusted to the first predetermined voltage, the output current is a first predetermined current; when the detection circuit detects that the first predetermined current changes to a first change current, the control unit adjusts the output voltage to be a second predetermined current.

12. The power supply system with line loss reduction in claim 9, wherein the detection circuit is further coupled to the input end, and the control unit acquires the input voltage by detecting the input end by the detection circuit; when the control unit realizes that a voltage difference between the input voltage and the output voltage is less than a voltage threshold through the detection circuit, the control unit turns on the bypass switch to bypass the step-up converter.

13. A method of reducing line loss of a power supply system, the power supply system comprising a step-up converter, and the step-up converter providing a load voltage to a load through a power line, the method comprising steps of:

setting a terminal voltage required by the load, and controlling an output voltage of the step-up converter to be the terminal voltage, detecting an output current corresponding to the terminal voltage to be a present current, controlling the output voltage to be a modulated voltage, and detecting the output current corresponding to the modulated voltage to be a modulated current, and adjusting the output voltage to be a first predetermined voltage according to the terminal voltage, the present current, the modulated voltage, and the modulated current, wherein the load voltage acquired by subtracting a power line voltage drop of the power line from the first predetermined voltage equals the terminal voltage, and wherein under a condition that the output voltage is adjusted to the first predetermined voltage to satisfy that the load voltage is the terminal voltage, the step-up converter is bypassed when a voltage difference between an input voltage and an output voltage of the step-up converter is less than a voltage threshold.

14. The method of reducing line loss of the power supply system in claim 13, further comprising steps of:

acquiring a first output power by the product of the terminal voltage and the present current, acquiring a second output power by the product of the modulated voltage and the modulated current, acquiring a power difference by subtracting the second output power from the first output power, and adjusting the output voltage to the first predetermined voltage according to the power difference, the terminal voltage, the present current, the modulated voltage, and the modulated current.

15. The method of reducing line loss of the power supply system in claim 14, further comprising steps of:

acquiring the power line voltage drop as a first voltage drop according to the power difference, the present current, the modulated voltage, and the modulated current, and adjusting the output voltage to the first predetermined voltage through the first voltage drop and the terminal voltage.

16. The method of reducing line loss of the power supply system in claim 14, wherein after the output voltage is adjusted from the terminal voltage to the modulated voltage, the output voltage is adjusted back to the terminal voltage to confirm whether the product of the terminal voltage and the output current corresponding to the terminal voltage is within an error range of the first output power.

17. The method of reducing line loss of the power supply system in claim 15, wherein the first predetermined voltage satisfies:

$$Vo(\text{set})=Vo1+Vr1\times(Vo1-Vr1)/Vo1,$$

in which, Vo(set) represents the first predetermined voltage, Vo1 represents the terminal voltage, and Vr1 represents the first voltage drop.

18. The method of reducing line loss of the power supply system in claim 15, wherein when the output voltage is adjusted to the first predetermined voltage, the output current is a first predetermined current; when a load power of the load changes so that the first predetermined current changes to a first change current, a second voltage drop is acquired according to the first voltage drop, the first change current, and the present current, and the output voltage is adjusted to a second predetermined voltage according to the terminal voltage the first predetermined voltage, and the second voltage drop.

19. The method of reducing line loss of the power supply system in claim 18, wherein the second voltage drop satisfies:

$$Vr3=Vr1\times Io3/Io1,$$

in which, Vr3 represents the second voltage drop, Vr1 represents the first voltage drop, Io3 represent the first change current, and Io1 represents the present current.

20. The method of reducing line loss of the power supply system in claim 13, wherein under a condition that the output voltage is adjusted to the first predetermined voltage to satisfy that the load voltage is the terminal voltage which is predetermined, when the output voltage is equal to the first predetermined voltage, the sum of a loss of the step-up converter and a loss of the power line is calculated as a first loss, when the step-up converter is bypassed, the loss of the power line is calculated as a second loss; when the first loss is greater than or equal to the second loss, the step-up converter is bypassed.

21. A power supply system with line loss reduction configured to provide a load voltage to a load through a power line, the power supply system comprising:
- a step-up converter having an input end and an output end, the input end configured to receive an input voltage, and the output end configured to provide an output voltage to supply power to the load,
- a detection circuit coupled to the output end,
- a control unit coupled to the step-up converter and the detection circuit, and configured to control the step-up converter to convert the input voltage into the output voltage, and
- a bypass switch coupled to the step-up converter in parallel and coupled to the control unit,
- wherein the control unit sets a terminal voltage required by the load, and controls the output voltage to be the terminal voltage; the control unit acquires an output current corresponding to the terminal voltage to be a present current by detecting the output end by the detection circuit; the control unit controls the output voltage to be a modulated voltage, and acquires an output current corresponding to the modulated voltage to be a modulated current by detecting the output end by the detection circuit; the control unit adjusts the output voltage to be a first predetermined voltage according to the terminal voltage, the present current, the modulated voltage, and the modulated current so that the load voltage acquired by subtracting a power line voltage drop of the power line from the first predetermined voltage equals the terminal voltage, and
- wherein the detection circuit is further coupled to the input end, and the control unit acquires the input voltage by detecting the input end by the detection circuit; when the control unit realizes that a voltage difference between the input voltage and the output voltage is less than a voltage threshold through the detection circuit, the control unit turns on the bypass switch to bypass the step-up converter.

22. The power supply system with line loss reduction in claim 21, wherein after the output voltage is adjusted from the terminal voltage to the modulated voltage, the control unit adjusts the output voltage back to the terminal voltage, and detects that the output current to be a confirmation current through the detection circuit; the control unit determines whether the confirmation current is within an error range of the present current.

23. The power supply system with line loss reduction in claim 21, wherein when the output voltage is adjusted to the first predetermined voltage, the output current is a first predetermined current; when the detection circuit detects that the first predetermined current changes to a first change current, the control unit adjusts the output voltage to be a second predetermined current.

24. The power supply system with line loss reduction in claim 21, wherein when the control unit calculates the sum of a loss of the step-up converter and a loss of the power line as a first loss when the output voltage is equal to the first predetermined voltage, and calculates the loss of the power line as a second loss when the step-up converter is bypassed; when the control unit determines that the first loss is greater than or equal to the second loss, the control unit turns on the bypass switch to bypass the step-up converter.

* * * * *